United States Patent [19]

Risse et al.

[11] Patent Number: 4,769,423

[45] Date of Patent: Sep. 6, 1988

[54] BLOCK COPOLYMERS OF OPTIONALLY SUBSTITUTED POLY(OXY-1,4-PHENYLENE) SEGMENTS AND LIQUID CRYSTALLINE SEGMENTS

[75] Inventors: Wilhelm Risse, Marburg; Walter Heitz, Kirchhain, both of Fed. Rep. of Germany

[73] Assignee: Bayer Aktiengesellschaft, Leverkusen, Fed. Rep. of Germany

[21] Appl. No.: 826,853

[22] Filed: Feb. 6, 1986

[30] Foreign Application Priority Data

Feb. 14, 1985 [DE] Fed. Rep. of Germany ....... 3505142

[51] Int. Cl.$^4$ .............................................. C08L 71/04
[52] U.S. Cl. .................................... 525/390; 525/392; 525/397; 525/905
[58] Field of Search ................. 525/390, 397, 392

[56] References Cited

U.S. PATENT DOCUMENTS

| | | | |
|---|---|---|---|
| 3,703564 | 11/1972 | White | 525/397 |
| 3,770,699 | 11/1973 | White | 525/397 |
| 3,770,850 | 11/1973 | White | 525/905 |
| 3,875,256 | 4/1975 | White | 525/397 |
| 4,659,763 | 4/1987 | Gallucci et al. | 525/397 |

OTHER PUBLICATIONS

J. E. McGrath et al., "Jour. Polymer Sci.": Polymer Symposium No. 60, 1977, pp. 29–46.

*Primary Examiner*—Jacob Ziegler
*Attorney, Agent, or Firm*—Connolly and Hutz

[57] ABSTRACT

The invention relates to block copolymers of optionally substituted poly(oxy-1,4-phenylene) segments and liquid crystalline segments.

7 Claims, No Drawings

BLOCK COPOLYMERS OF OPTIONALLY SUBSTITUTED POLY(OXY-1,4-PHENYLENE) SEGMENTS AND LIQUID CRYSTALLINE SEGMENTS

The invention relates to block copolymers of optionally substituted poly(oxy-1,4-phenylene) segments and liquid crystalline segments.

Liquid crystalline homopolymers are known: For example, A. Cifferi in W. R. Krigbaum, R. B. Meyer, Polymer Liquid Crystals, Academic Press 1982; J. Preston in A. Blumstein, Liquid Crystalline Order in Polymers, Academic Press 1978. It is furthermore known that polyoxyphenylenes can be mixed with styrene polymers.

It has now been found that the known properties of liquid crystalline homopolymers can be utilised for specific purposes when they are synthesised with other polymers to form block copolymers. Thus, according to the invention, new block copolymers from liquid crystalline segments and poly(oxy-1,4-phenylene) segments which derive from monofunctional polyphenylenoxides formula (I) or difunctional polyphenylenoxides (formula II) by omitting the terminal hydrogens were found, in which

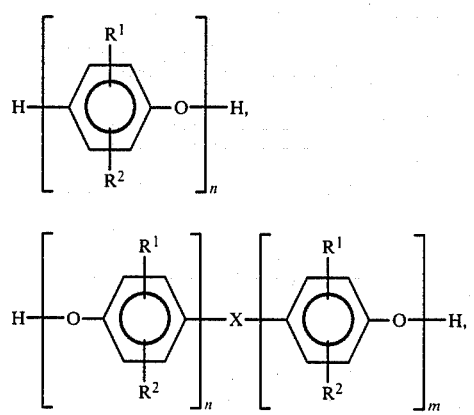

$R^1$ and $R^2$ independently of one another represent hydrogen, $C_1$-$C_6$ alkyl, halogen, $C_1$-$C_6$ alkenyl or $C_6$-$C_{14}$ aryl, X represents oxygen(O), sulphur(S) or $C_1$-$C_6$-alkylidene and n and m independently of one another represent an integer higher than the number 2.

The segments of optionally substituted poly(oxy-1,4-phenylenes) (polyphenylene oxides) used for the synthesis of the new block copolymers can be produced by known methods, e.g. by oxidative polymerisation or catalysed ether synthesis from optionally 2,6-disubstituted phenols. The catalytic ether synthesis is particularly suitable for the production of unsubstituted poly(oxy-1,4-phenylenes).

The segments of optionally substituted poly(oxy-1,4-phenylenes) can be described by the formulae I and II. Preferably $R^1$ and $R^2$, independently of one another represent hydrogen(H), methyl($CH_3$), chlorine(Cl), —$CH_2$—CH=$CH_2$, —$CH_2$—CH=CHCH$_3$ or $C_6H_5$, X represents O, S, $CH_2$ or i-propylidene and n and m represent an integer from 5 to 500.

The segments of optionally substituted poly(oxy-1,4-phenylenes) (block A) have phenolic hydroxyl end groups and can be condensed with other segments to form block polymers. This condensation can take place via the phenolic OH groups.

The segments of optionally substituted poly(oxy-1,4-phenylenes) can be condensed with segments having liquid crystalline properties (block B) to form the new block copolymers according to the invention.

The known segments having liquid crystalline properties which can be used can correspond to the formula III, IV or V:

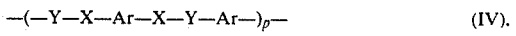

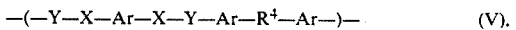

in which
Ar represents

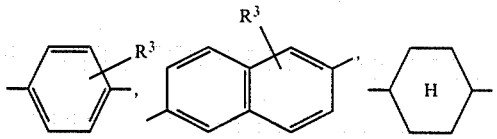

(1,4-cyclohexylidene in the form of a hydrogenated aromatic ring), wherein in formulae (IV) and (V) the radicals Ar can have different meanings, X—Y represents —COO, —CONH, —$CH_2CH_2$—, —CH=CH—, —CH=N—, —N=N— or —NO=N—, wherein X—Y can have different meanings in formulae (IV) and (V), $R^3$ represents hydrogen, $C_1$-$C_{18}$ alkyl, $C_5$-$C_{18}$ cycloalkyl, $C_6$-$C_{14}$ aryl or —CH=CH-phenyl, O represents an integer $\geq 5$, preferably 5 to 500, $R^4$ represents $C_1$-$C_{12}$ alkylene, $C_5$-$C_{10}$ cycloalkylene, —$OR^5$ and —$OR^5O$—, wherein $R^5$ represents $C_1$-$C_{12}$ alkylene, $C_5$-$C_{10}$ cycloalkylene, —O($CH_2$—$CH_2O$)$_q$, wherein q represents an integer 2, 3, 4 or 5.

By condensation of the segments of the formulae (I) and/or (II) block A) with the segments of the formulae III, IV and/or V (block B) block copolymers having differing structures can be synthesised. Thus, for example blocks can be synthesised which have the structures AB, ABA, BAB and (AB)$_x$, wherein X represents a number $\geq 1$, preferably 2 to 100.

In the synthesis of the blocks the polyphenylene oxide blocks A of the formulae I and II can be linked with the liquid crystalline blocks B via the phenolic OH groups of the polyphenylene oxide blocks via ether or ester groups.

The percentage by weight of block A is 3 to 97% and that of B 97 to 3%, based on the total weight (blocks A+B).

The new block copolymers can form anisotropic melts on being heated, which can have an advantageous effect on their use, for example when being mixed with other polymers.

The block copolymers can for example be used as phase mediators in polymeric two-phase systems (polymer mixtures), e.g. when styrene-containing polymers are to be mixed with liquid crystalline polymers. The polymer mixtures which contain the new block copolymers can be processed further for known uses, e.g. as mouldings, injection-moulding materials, films, fibres, etc.

The production of the block copolymers of poly(oxy-1,4-phenylene) segments of the formulae (I) and (II) by reaction with liquid crystalline segments of the formulae (III, IV and V can be carried out by various known methods in an analogous manner:

Method (a)

The synthesis of the liquid crystalline block B with two reactive end groups, for example acid chloride groups, is carried out by using a suitable excess of a starting compound, for example trans-1,4-cyclohexane dicarboxylic acid dichloride. The reaction with the polyphenylene ether then takes place (block A).

The duration of reaction for the synthesis of the liquid crystalline block and the reaction with the polyphenylene ether can in each case be between 1 hour and several days, preferably between 1 and 48 hours. The reaction temperature is between $-78°$ C. and $150°$ C., preferably between $20°$ C. and $120°$ C. The following can be used as a solvent: ethers such as diphenyl ether or hydroquinone dimethylether, sulfolane, dimethylsulphoxide, N-methyl pyrrolidone, halogenated hydrocarbons, such as, for example, carbon tetrachloride, chloroform, methylene chloride, 1,1,2,2-tetrachloroethane or mixtures of these. The reactions are carried out in the presence of bases such as pyridine, alkyl-substituted pyridines, 4-dimethyl-amino pyridine, open-chain or cyclic aliphatic amines such as triethylamine or piperidine. The bases can also act as a solvent.

Method (b)

The polyphenylene ether is initially introduced with an excess of a starting compound required for the synthesis of the liquid crystalline block, for example an acid dichloride. The excess is selected such that between 2 and 100 mol, preferably between 5 and 50 mol of this compound are used per mol of polyphenylene ether. The reaction time is between 30 minutes and several days, preferably between 1 and 24 hours. The remaining components required for the synthesis of the liquid crystalline block, for example aromatic diols, are then added. The reaction time for this reaction is between 30 minutes and several days, preferably between 5 and 48 hours. The reaction temperature for both reaction stages is selected between $-78°$ C. and $+150°$ C., preferably between $20°$ C. and $100°$ C.

Those solvents and bases given under method (a) can be used.

Method (c)

The polyphenylene ether is initially introduced together with the starting compounds for the synthesis of the liquid crystalline polyester or polyamide block, consisting of one or more dicarboxylic acids, one or more aromatic diols or one or more aromatic diamines. In one reaction stage the liquid crystalline block is synthesised by reaction with triphenylphosphine and hexachloroethane and is simultaneously coupled to the polyphenylene ether block. Between 1 and 4 mol, preferably between 1 and 2 mol of triphenyl phosphine and between 1 and 5 mol of hexachloroethane are used per mol of dicarboxylic acid.

Amines such as pyridine or methyl-substituted pyridines can be used as a solvent. The reaction time can be selected between 1 hour and several days, preferably between 5 and 48 hours. The reaction temperature can be between $-40°$ C. and $150°$ C., preferably between $20°$ C. and $120°$ C.

EXAMPLES

I. Preparation of the monofunctional polyphenylene ether blocks used

EXAMPLE 1

Oxidative Polymerisation 2 g of CuCl (20 mmol) in 50 ml of pyridine (0.62 mol) and 100 ml of chloroform are initially placed in a 1 l three-necked flask with a KPG stirrer, gas inlet pipe and gas outlet. Oxygen is introduced into this catalyst solution for 15 minutes. 100 g of 2,6-dimethylphenol (0.82 mol) dissolved in 500 ml of chloroform are then added. The reaction mixture warms to about $30°$ C. The oxygen introduction is continued until a 0.2 ml sample of the reaction solution produces a precipitate when added dropwise into a mixture of 25 ml of THF and 7.5 ml of methanol. The reaction solution is extracted three times by shaking in each case with 50 ml of an aqueous EDTA solution. The organic phase is added to a mixture of 3 l of methanol and 50 ml of concentrated HCl. The precipitated polymer is filtered off, washed with methanol, dried, dissolved in 300 ml of chloroform and precipitated again with a mixture of 1.5 l of methanol and 10 ml of concentrated HCl. The product is dried at $70°$ C. in an oil pump vacuum. Yield: 45.3 g (46%), molecular weight $M_n=1260$ (determined by vapour pressure osmometry), titrated functionality of phenolic OH groups$=1.0$.

EXAMPLE 2

Polymerisation by halogen substitution of 6-bromo-2,6-dimethylphenol 0.3 g of CuCl (3 mmol) and 50 ml of pyridine are initially placed in a 250 ml three-necked flask with a gas inlet and gas outlet. Stirring is carried out by means of a magnetic stirrer and oxygen is introduced for 10 minutes. The oxygen introduction is then terminated and nitrogen is introduced into the activated catalyst solution. After 10 minutes, 10 g of 4-bromo-2,6-dimethylpenol (50 mmol) are added under nitrogen. 15 minutes later, 1.1 g of potassium-tert.-butylate (10 mmol) are added. The reaction mixture warms over a short time to $45°$ C. After a reaction time of 2 hours, the reaction mixture is added to 400 ml of methanol and 10 ml of concentrated HCl. The precipitated polymer is filtered off, washed with a mixture of 100 ml of methanol and 5 ml of concentrated HCl and then washed with methanol and distilled water.

The polymer is dried, dissolved in chloroform, precipitated again with methanol, filtered and dried at $70°$ C. in an oil pump vacuum.

Yield: 3.1 g (52%), molecular weight, determined by vapour pressure osmometry $M_n=2400$, titrated OH functionality$=0.9$.

EXAMPLE 3

The polymerisation of 4-bromophenol by Ullmann etherification

In a 500 ml nitrogen flask, 3.32 g of sodium (0.144 mol) are added portion-wise under nitrogen to 100 ml of absolute methanol. Stirring is carried out by means of a magnetic stirrer. After the sodium has completely reacted, 25 g of 4-bromophenol (0.144 mol) are added. After a reaction time of 1 hour, the methanol is completely removed in an oil pump vacuum. 90 g of absolute and melted down hydroquinone dimethylether are added under nitrogen. 0.24 g of copper (I) chloride (2.4 mmol) and 1 ml of pyridine are subsequently added. The reaction vessel is provided with a reflux condenser and is heated for 15 minutes in an oil bath to 100° C. The reaction temperature is then increased to 200° C. After a reaction time of 5 hours, the temperature is lowered to 80° C. and the reaction mixture is added to 500 ml of methanol. The polymer and sodium bromide precipitate during this addition. The precipitate is filtered and washed with diethylether, methanol and water. The polymer is dissolved by heating to 110° C. in 150 ml of pyridine, filtered hot and precipitated again with methanol.

Yield: 7.3 g (55%), $\eta_{inh}=0.14$ (NMP at 30° C.), molecular weight $M_n$ determined by vapour pressure osmometry=3500.

II. Synthesis of the bifunctional polyphenylene ether blocks used

EXAMPLE 4

Oxidative copolymerisation 1.5 of copper(I) chloride (15 mmol), 3.7 of 4-dimethylaminopyridine (30 mmol) and 50 ml of chloroform are placed in a 1 l three-necked flask with a KPG stirrer, gas inlet pipe and gas outlet. This catalyst solution is activated by introducing oxygen with stirring (magnetic stirrer). After 15 minutes, 4.65 g of 3,3′,5,5′-tetramethyl bisphenol-A (16.4 mmol) and 50 g of 2,6-dimethylphenol (0.41 mol) dissolved in 300 ml of chloroform are added and the introduction of oxygen is continued for 2 hours. The reaction temperature is maintained at 20° C. by means of a water bath. The polymer is precipitated by being poured into a mixture of 1.2 l of methanol and 10 ml of concentrated HCl, filtered, washed with methanol and dried. The polyphenylene ether is dissolved in 200 ml of chloroform and precipitated with a mixture of 1 l of methanol and 5 ml of concentrated HCl, filtered, washed with methanol and dried at 70° C. in an oil pump vacuum.

Yield: 44 g (80%), molecular weight $M_n$ determined by vapour pressure osmometry=3500, titrated OH functionality=1.75.

EXAMPLE 5

Copolymerisation with halogen substitution 0.4 g of copper (I) chloride (4 mmol) and 60 ml of pyridine are initially placed in a 250 ml nitrogen flask. Oxygen is introduced for 10 minutes while stirring by means of a magnetic stirrer. The oxygen introduction is terminated and nitrogen is introduced. After 10 minutes, 10 g of 4-bromo-2,6-dimethylphenol (49.8 mmol) and 0.4 g of 3,3′,5,5′-tetramethyl bisphenol-A(1.4 mmol) are added. 4.5 g of potassium-tert.-butylate (40 mmol) are added in 4 equal portions within 1 hour. During this addition the reaction vessel is heated to 20° C. by means of a water bath. After reacting for a further hour, the reaction solution is added to a mixture of 400 ml of methanol and 10 ml of concentrated HCl. The precipitated polymer and coprecipitated potassium bromide are filtered, washed with a mixture of 100 ml of methanol and 10 ml of concentrated HCl, washed with methanol and distilled water and dried. The polymer is dissolved in 50 ml of THF and precipitated again with 300 ml of distilled water. The product is washed with water and methanol and dried at 70° C. in an oil pump vacuum.

Yield: 5.1 g (80%), molecular weight $M_n$ determined by vapour pressure osmometry=3600, inherent viscosity (determined in 1,1,2,2-tetrachloroethane/phenol 60/40) $\eta_{inh}=0.14$, titrated functionality of phenolic OH groups=1.9.

III. The preparation of $(AB)_n$ block copolymers by copolymerisation method c

EXAMPLE 6

504 mg of the polyphenylene ether in Example 5 ($M_n=3600$, 0.14 mmol), 344 mg of trans-1,4-cyclohexane dicarboxylic acids (2 mmol) and 231 mg of 2-methylhydroquinone (1.86 mmol) are dissolved under nitrogen in 20 ml of pyridine. The reaction apparatus is a 100 ml three-necked flask with a gas inlet, gas outlet and reflux condenser. The reaction solution is stirred by means of a magnetic stirrer. 1.31 g of triphenylphosphine (5 mmol) and 1.42 g of hexachloroethane (6 mmol) are added one after the other. The reaction mixture becomes warm during this addition. A reaction temperature of 70° C. is set by means of an oil bath. After 18 hours the reaction is terminated and the polymer is precipitated in acetone, filtered, washed with water, methanol and acetone and dried at 70° C. in an oil pump vacuum.

Yield: 0.88 g (85%), inherent viscosity $\eta_{inh}=0.66$ (measured in 1,1,2,2-tetrachloroethane(TCE)/phenol60/40 at 30° C.) PPO content=49% by weight (IR spectroscopy), 52% by weight ($H^1$-NMR-spectroscopy in $d^2$ 1,1,2,2-tetrachloroethane/$d^6$-phenol 95/5), anisotropic melt above 255° C. (polarizing microscopy).

EXAMPLE 7

Preparation according to copolymerisation method b 537 mg of trans-1,4-cyclohexane dicarboxylic acid dichloride (2.56 mmol) are dissolved under nitrogen in 5 ml of chloroform in the reaction apparatus consisting of a 100 ml three-necked flask with a reflux condenser, gas inlet pipe and gas outlet. To the apparatus is added a solution of 595 mg of poly(2,6-dimethyl-1,4-phenylene oxide) (polymer from Example 4, 0.17 mmol) with stirring (magnetic stirrer) 8 ml of chloroform and 2 ml of pyridine. The reaction temperature is maintained at 40° C. by means of an oil bath. After 2 hours 296 mg of 2-methylhydroquinone (2.39 mmol) dissolved in 5 ml of pyridine are added. After a reaction time of 18 hours at 40° C., the block copolymer is precipitated in 150 ml of acetone, filtered and washed with methanol, water and acetone. The polymer is dried at 70° C. in an oil pump vacuum.

Yield: 1.09 g (87%), $\eta_{inh}=0.26$ (TCE/phenol 60/40% by weight at 30° C.), anisotropic melt above 250° C. (polarizing microscopy).

IV. The synthesis of AB and ABA block polymers from polyphenylene ether blocks A and liquid crystalline blocks B

EXAMPLE 8

Copolymerisation method c 689 mg of trans-1,6-cyclohexane dicarboxylic acids (4 mmol), 477 mg of 2-methyl hydroquinone (3.85 mmol) and 528 mg of the poly(2,6-dimethyl-1,4-phenylene oxide) (0.3 mmol) produced in Example 1 are dissolved in 15 ml of pyridine. The reaction apparatus consists of a 100 ml three-necked flask with a gas inlet, gas outlet and reflux condenser. Stirring is carried out with a magnetic stirrer. 2.62 g of triphenylphosphine (10 mmol) and 2.84 g of hexachloroethane (12 mmol) are added one after the other under nitrogen. The reaction mixture becomes warm and is heated by means of an oil bath to a temperature of 50° C. After a reaction time of 18 hours, the block copolymer is precipitated in 150 ml of methanol. The product is filtered, washed several times with acetone, water and methanol and dried.

Yield: 1.2 g (78%), $\eta_{inh}$=0.32 (TCE/phenol 60/40% by weight at 30° C.), PPO content (IR spectroscopy)=30% by weight, polarizing microscopy shows liquid crystalline behaviour above 230° C.

EXAMPLE 9

Copolymerisation method b 980 mg of trans-1,4-cyclohexane dicarboxylic acid dichloride (4.7 mmol) are dissolved under nitrogen in 6 ml of 1,1,2,2-tetrachloroethane in a 100 ml three-necked flask with a gas inlet, gas outlet and reflux condenser. 488 mg of monofunctional polyphenylene ether from Example 2 ($M_n$=2400, 0.2 mmol) dissolved in 8 ml of 1,1,2,2-tetrachloroethane and 2 ml of pyridine are added with stirring (magnetic stirrer) by means of a 20 ml syringe. The reaction vessel is heated to 60° C. in an oil bath. After 1.5 hours 569 mg of 2-methylhydroquinone (4.6 mmol) dissolved in 5 ml of 1,1,2,2-tetrachloroethane and 5 ml of pyridine are added. After reacting for a further 18 hours at 60° C., the product is precipitated in 150 ml of acetone, filtered and washed with water, methanol and acetone. The polymer is dried at 70° C. in an oil pump vacuum.

Yield: 1.21 g (72%), $\eta_{inh}$=0.28 (determined in TCE/phenol 60/40% by weight at 30° C.). The polymer forms an anisotropic melt above 230° C.

EXAMPLE 10

Copolymerisation method c 344 mg of trans-1,4-cyclohexane dicarboxylic acid (2 mmol), 232.5 mg of 2-methylhydroquinone (1.88 mmol) and 500 ml of poly(1,4-phenylene oxide) (product from Example 3), (0.14 mmol) are dissolved by heating to 120° C. (oil bath) in 20 ml of pyridine in the reaction apparatus consisting of a 100 ml three-necked flask, reflux condenser, gas inlet and gas outlet part. The reaction mixture is under an inert gas atmosphere (nitrogen). Stirring takes place by means of a magnetic stirrer. 1.31 g of triphenylphosphine (5 mmol) and 1.42 g of hexachloroethane (6 mmol) are added one after the other. The reaction mixture is heated for 18 hours to 80° C. After cooling, the block copolymer is precipitated in 150 ml of methanol, filtered and washed with acetone, methanol and water. The product is dried at 70° C. in an oil pump vacuum.

Yield: 900 mg (90%). Above 230° C. the polymer appears as an anisotropic melt in the polarizing microscope. According to the C, H, O, analysis, the block copolymer has a content of 50.9% of polyphenylene oxide; the theoretical value is 49.8%.

We claim:

1. Block copolymers comprising blocks A and B wherein block A is a poly(oxy-1,4-phenylene) segment and block B is a polymer segment having the properties of a liquid crystal.

2. Block copolymers according to claim 1, characterised in that they substantially have the structure AB.

3. Block copolymers according to claim 1, characterised in that they substantially have the structure ABA.

4. Block copolymers according to claim 1, characterised in that they substantially have the structure BAB.

5. Block copolymers according to claim 1, characterised in that they substantially have the structure $(AB)_x$, where x represents a number>1.

6. Block copolymers according to claim 1, characterised in that the percentage by weight of the block A is 3 to 97% and the percentage by weight of the block B is 97 to 3%.

7. Block copolymers according to claim 1, characterised in that the blocks are linked via ether or ester groups.

* * * * *